United States Patent
Yoshitake et al.

(10) Patent No.: US 7,208,561 B2
(45) Date of Patent: Apr. 24, 2007

(54) SACCHARIDE RESIDUE-FUNCTIONAL ORGANOPOLYSILOXANES AND METHOD FOR THE PREPARATION THEREOF

(75) Inventors: Makoto Yoshitake, Chiba Prefecture (JP); Daiyo Terunuma, Saitama Prefecture (JP); Koji Matsuoka, Saitama Prefecture (JP); Ken Hatano, Saitama Prefecture (JP)

(73) Assignee: Dow Corning Toray Silicone, Co. Ltd., Tokyo (JP)

( * ) Notice: Subject to any disclaimer, the term of this patent is extended or adjusted under 35 U.S.C. 154(b) by 138 days.

(21) Appl. No.: 10/494,626

(22) PCT Filed: Nov. 12, 2002

(86) PCT No.: PCT/JP02/11807

§ 371 (c)(1),
(2), (4) Date: May 27, 2004

(87) PCT Pub. No.: WO03/042283

PCT Pub. Date: May 22, 2003

(65) Prior Publication Data

US 2005/0038184 A1 Feb. 17, 2005

(30) Foreign Application Priority Data

Nov. 13, 2001 (JP) .............................. 2001-348122

(51) Int. Cl.
*C08G 77/22* (2006.01)

(52) U.S. Cl. ........................................ 528/30; 525/474
(58) Field of Classification Search .................. 528/30; 525/474

See application file for complete search history.

(56) References Cited

U.S. PATENT DOCUMENTS 6,218,560 B1 * 4/2001 Abele et al. ................ 556/413

FOREIGN PATENT DOCUMENTS

| JP | SHO62-68820 | 3/1987 |
| JP | HEI5-186596 | 7/1993 |
| JP | HEI8-134103 | 5/1996 |
| JP | HEI11-92490 | 4/1999 |

* cited by examiner

*Primary Examiner*—Kuo-Liang Peng
(74) *Attorney, Agent, or Firm*—Howard & Howard Attorneys, P.C.

(57) ABSTRACT

A saccharide residue-functional organopolysiloxane containing at least two monosaccharide or polysaccharide groups per molecule in which a specific site on the monosaccharide or polysaccharide is bonded to silicon through a thioether bond. Also, a method of preparing the saccharide residue-functional organopolysiloxane, comprising condensing a saccharide residue-functional metal thiolate compound wherein the metal is an alkali metal atom or alkaline-earth metal atom, and an organopolysiloxane containing groups having the formula —$R^2Q$ wherein $R^2$ is $C_2$ to $C_{10}$ alkylene, and Q is a group selected from halogen atoms, $C_1$ to $C_{10}$ alkylsulfonate groups, and $C_6$ to $C_{20}$ arylsulfonate groups.

18 Claims, No Drawings

SACCHARIDE RESIDUE-FUNCTIONAL ORGANOPOLYSILOXANES AND METHOD FOR THE PREPARATION THEREOF

This invention relates to novel saccharide residue-functional organopolysiloxanes and to a method for their preparation. More particularly, this invention relates to saccharide residue-functional organopolysiloxanes in which monosaccharide or polysaccharide is bonded through a thioether bond to silicon and to a method for the preparation of said saccharide residue-functional organopolysiloxanes.

While the important role played by saccharides in mediating biological functions has been known for some time, unique interactions between substances originating in the steric structure of saccharides have been elucidated only very recently, and, concurrent therewith, the development of drugs and functional materials that effectively utilize these functionalities has attracted attention.

With this goal in mind, methods for bonding saccharides to synthetic polymers are already known, as are attempts to apply these methods. Organopolysiloxanes, because they are biologically inert, are ideal materials for drugs, therapeutic materials, and cosmetics, and a number of saccharide residue-functional organopolysiloxanes—and methods for their preparation—have been introduced to date.

For example, Japanese Patent Application Publication (Kokai) No. Sho 62-68820 (68,820/1987) discloses saccharide residue-functional organopolysiloxane in which saccharide is linked to polysiloxane through an amide bond; Japanese Patent Application Publication (Kokai) No. Hei 5-186596 (186,596/1993) discloses saccharide residue-functional organopolysiloxane in which saccharide is linked to polysiloxane through a glycosidic bond; Japanese Patent Application Publication (Kokai) No. Hei 8-134103 (134,103/1996) discloses saccharide residue-functional organopolysiloxane in which saccharide is linked to polysiloxane through a urethane bond; and Japanese Patent Application Publication (Kokai) No. Hei 11-92490 (92,490/1999) discloses saccharide residue-functional organopolysiloxane in which saccharide is linked to polysiloxane through a glycosidic or thioglycosidic bond.

These saccharide residue-functional organopolysiloxanes, however, suffer from a number of drawbacks. For example, due to instability in the linkage moiety, cleavage of the linkage resulting in decomposition can occur quite readily in these saccharide residue-functional organopolysiloxanes. In addition, depending on the particular linkage moiety, the polar interactions of the linkage moiety can inhibit the manifestation of the properties of the saccharide. With regard to the synthesis of the referenced saccharide residue-functional organopolysiloxanes, it has been quite difficult to effect bonding at only a specific site of the saccharide.

The inventors achieved this invention as a result of intensive investigations directed to solving the problems identified above. In specific terms, an object of this invention is to provide novel saccharide residue-functional organopolysiloxanes that are stable and that do not suffer from any impairment in the functionality of the saccharide. An additional object of this invention is to provide a method for the preparation of these novel saccharide residue-functional organopolysiloxanes. More particular objects of this invention are to provide novel saccharide residue-functional organopolysiloxanes in which a specific site on the monosaccharide or polysaccharide is bonded through a thioether bond to silicon and to provide a method for the preparation of these novel saccharide residue-functional organopolysiloxanes.

This invention relates to saccharide residue-functional organopolysiloxane that is represented by the general formula:

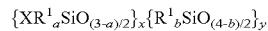

wherein $R^1$ is $C_1$ to $C_{10}$ alkyl or aryl; X is a group having the formula $—R^2—S—R^3—Y$ wherein $R^2$ and $R^3$ are each independently selected from $C_1$ to $C_{20}$ divalent hydrocarbyl and Y is a substituted or unsubstituted monosaccharide or polysaccharide residue having an oxygen atom bonded to $R^3$; a is an integer from 0 to 2; b is an integer from 0 to 3; x is an integer with a value of at least 2; and y is an integer with a value of at least 0; wherein when an individual siloxane structural unit is present in a plural number, these may be the same as or may differ from each other.

This invention additionally relates to a method for preparing the saccharide residue-functional organopolysiloxane, by effecting a condensation reaction between a saccharide residue-functional metal thiolate compound having the formula $M—S—R^3—Y$ wherein $R^3$ and Y are defined as above, M is an alkali metal atom or alkaline-earth metal atom, and an organopolysiloxane represented by the general formula:

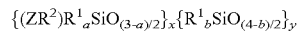

wherein $R^1$, $R^2$, a, b, x, and y are defined as above and Z is a group selected from halogen atoms, $C_1$ to $C_{10}$ alkylsulfonate groups, and $C_6$ to $C_{20}$ arylsulfonate groups wherein when an individual siloxane structural unit is present in a plural number, these may be the same as or may be different from each other.

The saccharide residue-functional organopolysiloxane according to this invention is represented by the following general formula:

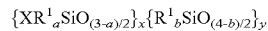

$R^1$ in this formula is $C_1$ to $C_{10}$ alkyl or aryl. The alkyl can be exemplified by methyl, ethyl, propyl, butyl, pentyl, isopropyl, isobutyl, cyclopentyl, and cyclohexyl, while the aryl can be exemplified by phenyl and naphthyl. Methyl is preferred among the preceding for $R^1$. X in the preceding formula is a group with the general formula $—R^2—S—R^3—Y$ and is bonded to the silicon atom in the organosiloxane. $R^2$ and $R^3$ in this group are each independently selected from $C_1$ to $C_{20}$ divalent hydrocarbyl and can be exemplified by straight-chain alkylene such as ethylene, propylene, butylene, and hexylene; branched alkylene such as methylmethylene, methylethylene, 1-methylpentylene, and 1,4-dimethylbutylene; arylene such as 1,4-phenylene, 1,3-phenylene, and 4,4'-biphenylene; and aralkylene such as 1,4-bis(methylene)phenylene and 2,2-(para-phenylene)propylene. Y in $—R^2—S—R^3—Y$ represents a substituted or unsubstituted, mono- or polysaccharide residue whose bonding site with $R^3$ is in all instances an oxygen atom.

Monosaccharide units that can form the saccharide structure can be exemplified by glucopyranose (glucose), mannose, allose, altrose, galactose, idose, talose, gulose, ribose, arabinose, xylose, fructose, fucose, N-acetylglucosamine, N-acetylgalactosamine, sialic acid, and esters of the preceding. Y can be specifically exemplified by monosaccharide residues such as glucopyranosyl (glucosyl), mannosyl, allosyl, altrosyl, galactosyl, idosyl, talosyl, gulosyl, ribosyl, arabinosyl, xylosyl, fucosyl, fructosyl, N-acetylglucosaminyl, N-acetylgalactosaminyl, sialyl, and their esters; oligosaccharide residues such as mantosyl, cellobiosyl, lactosyl, mannotriosyl, globotriosyl, and their esters; and polysaccharide residues such as cellulosyl and amylosyl and their esters. Preferred among the preceding are monosaccharide residues and oligosaccharide residues that contain no more than 5 saccharide units. In addition, the oxygen atom in Y that bonds with $R^3$ is preferably a glycosidic oxygen atom.
The X under consideration can be specifically exemplified by structures having the following formulas wherein Ac is acetyl:
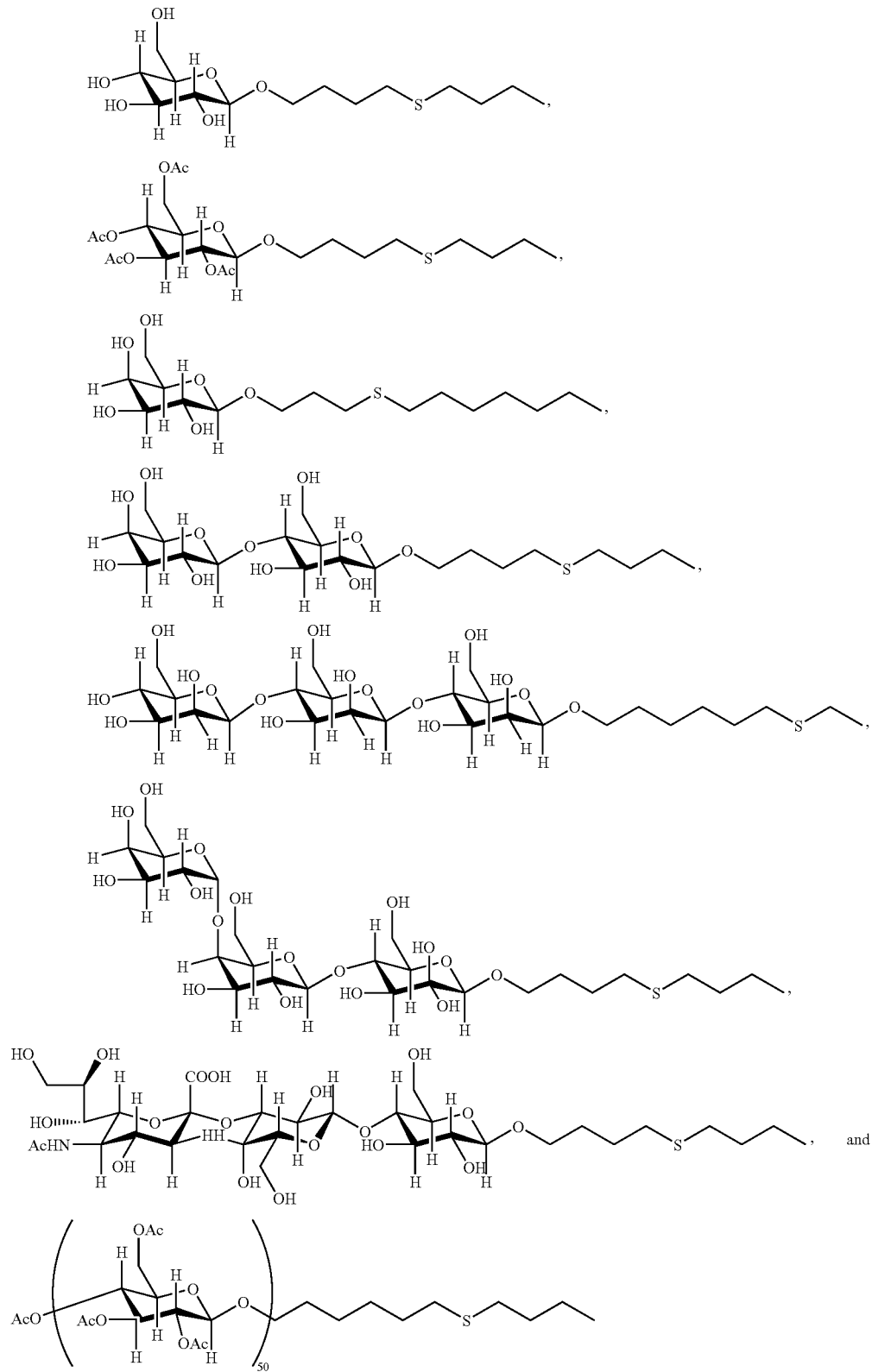

The subscripts in the general formula:

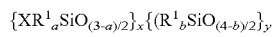

for the inventive saccharide residue-functional organopolysiloxane have the following values: a is an integer from 0 to 2, b is an integer from 0 to 3, x is an integer with a value of at least 2, and y is an integer with a value of at least 0. When an individual siloxane structural unit is present in a plural number, these may be the same as or may differ from each other. The organopolysiloxane under consideration can be specifically exemplified by organopolysiloxanes with the following general formulas, in which X and $R^1$ are defined as above and e, f, g, h, j, k, l, m, and n are integers that indicate the number of siloxane units present in each molecule:

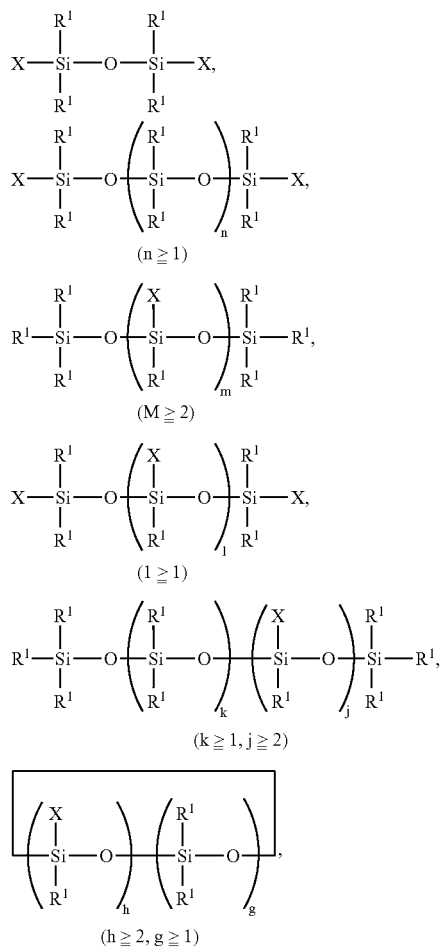

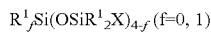

$R^1{}_f Si(OSiR^1{}_2 X)_{4-f}$ (f=0, 1)

$X_e Si(OSiR^1{}_2 X)_{4-e}$ (e=0, 1), $(XSiO_{3/2})_8$, and $(SiO_{4/2})_8 (XR^1{}_2 SiO_{1/2})_8$.

The inventive saccharide residue-functional organopolysiloxane can be synthesized by effecting a condensation reaction between a saccharide residue-functional metal thiolate compound M—S—$R^3$—Y and organopolysiloxane represented by the general formula $\{(ZR^2)R^1{}_a SiO_{(3-a)/2}\}_x \{R^1{}_b SiO_{(4-b)/2}\}_y$, wherein $R^1$, $R^2$, $R^3$, Y, a, b, x, and y are defined as above and $ZR^2$ is bonded to the silicon atom in the organosiloxane. Z is a group selected from halogen atoms, $C_1$ to $C_{10}$ alkylsulfonate groups, and $C_6$ to $C_{20}$ arylsulfonate groups. The halogen atoms encompassed by Z can be exemplified by the chlorine atom, bromine atom, and iodine atom. The alkylsulfonate group can be exemplified by methanesulfonate and ethanesulfonate and the arylsulfonate group can be exemplified by benzenesulfonate and toluenesulfonate. M is an alkali metal or alkaline-earth metal atom, for example, lithium, sodium, potassium, calcium, or magnesium. Since saccharide residue-functional metal thiolate compounds M-S—$R^3$-Y are generally difficult to isolate, they are preferably synthesized in the reaction system, for example, by the action of a metal or metal hydride on the corresponding saccharide residue-functional thiol compound or by the action of a metal on the corresponding saccharide residue-functional thioester or thioether compound, and used directly for the condensation reaction.

The method for preparing the organopolysiloxane starting material $\{(ZR^2)R^1{}_a SiO_{(3-a)/2}\}_x \{R^1{}_b SiO_{(4-b)/2}\}_y$ used in the synthesis of the inventive saccharide residue-functional organopolysiloxane is not critical. For example, this starting material can be directly synthesized by a hydrosilylation reaction between a halogen-, alkylsulfonate-, or arylsulfonate-functional alkenyl compound and a known SiH-functional organopolysiloxane. Alternatively, utilizing the hydroxyl present in an organopolysiloxane, this starting material can be synthesized by the introduction of halogen by a substitution reaction or by the introduction of an alkylsulfonate or arylsulfonate group by an esterification reaction. The starting material under consideration can also be synthesized by preparing the organopolysiloxane by the hydrolysis of an organohalosilane or organoalkoxysilane bearing a halogen-, alkylsulfonate-, or arylsulfonate-substituted organic group.

The saccharide residue-functional metal thiolate compound M—S—$R^3$—Y can be synthesized, for example, by converting the glycosidic hydroxyl of the saccharide molecule to an alkenyl ether by a known method; addition reacting a thiocarboxylic acid or thiol compound with the alkenyl group in the presence of a radical initiator to give, respectively, a thioester derivative or thioether compound; and reacting these products, respectively, with an alkali metal base such as alkali metal hydroxide or alkali metal methoxide, with alkaline-earth metal base such as alkaline-earth metal hydroxide, with an alkali metal, or with alkaline-earth metal.

The inventive saccharide residue-functional organopolysiloxane as described hereinabove, because it characteristically has a structure in which a specific site in the monosaccharide or polysaccharide is bonded to silicon through a thioether bond, is therefore also characterized by its stable nature and by no loss of saccharide functionality. As a consequence, the inventive saccharide residue-functional organopolysiloxane exhibits an excellent durability as a material while at the same time retaining the properties inherent to saccharides, such as pharmacological activity and biocompatibility. The inventive saccharide residue-functional organopolysiloxane therefore offers the advantage of being useful in a variety of applications, for example, as an ingredient for cosmetics, as a reagent for the separation of optical isomers, as a therapeutic material for the separation of, for example, toxins or viruses, as a therapeutic agent, and as an agrochemical. The inventive method for synthesizing saccharide residue-functional organopolysiloxane is characterized by its ability to very efficiently produce the subject organopolysiloxane.

The invention is explained in greater detail hereinbelow through working examples. The inventive saccharide residue-functional organopolysiloxane was identified in the examples by nuclear magnetic resonance analysis. In the reaction equations, chemical formulas, and text that follow, Pt cat. denotes a complex of platinum and 1,1,3,3-tetramethyl-1,3-divinyldisiloxane, Ac stands for the acetyl group, DMF stands for N,N-dimethylformamide, AIBN stands for azobisisobutyronitrile, and Ph stands for the phenyl group.

REFERENCE EXAMPLE 1

Tetrakis(bromopropyldimethylsiloxy)silane was synthesized by the following reactions starting from tetrakis(dimethylsiloxy)silane. Thus, allyloxytrimethylsilane was reacted with tetrakis(dimethylsiloxy)silane in the presence of a platinum 1,1,3,3-tetramethyl-1,3-divinyldisiloxane complex as catalyst to produce tetrakis(trimethylsiloxypropyldimethylsiloxy)silane, from which the trimethylsiloxy group was subsequently eliminated by the action of excess methanol to give tetrakis(hydroxypropyldimethylsiloxy)silane. Methanesulfonyl chloride was then reacted in pyridine with the tetrakis(hydroxypropyldimethylsiloxy)silane to give tetrakis(methanesulfonyloxypropyldimethylsiloxy)silane, which was subsequently reacted with sodium bromide in DMF to give tetrakis(bromopropyldimethylsiloxy)silane:

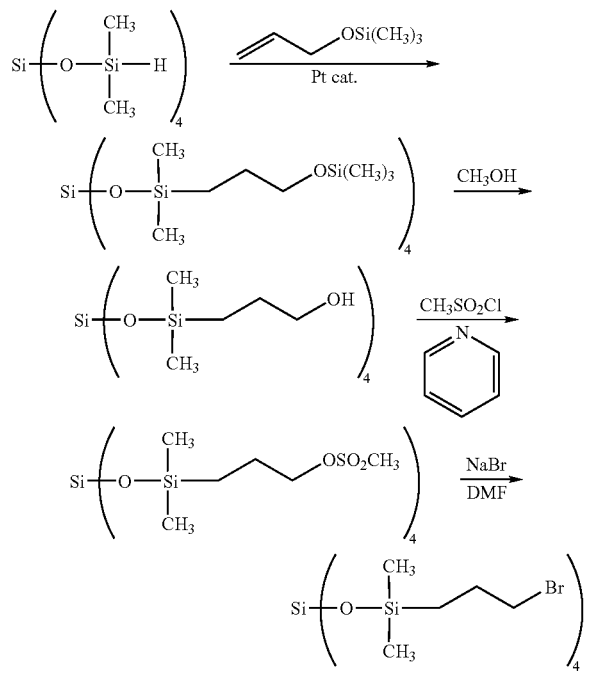

REFERENCE EXAMPLE 2

4-acetylthiobutyl 2,3,4,6-tetra-O-acetyl-β-D-glucopyranoside was synthesized by the following reactions from β-D-glucopyranose. Thus, acetyl 2,3,4,6-tetra-O-acetyl-β-D-glucopyranoside was prepared by exhaustive acetylation of the hydroxyl groups in β-D-glucopyranose by the action of sodium acetate in acetic anhydride. The acetyl 2,3,4,6-tetra-O-acetyl-β-D-glucopyranoside was subsequently reacted with 3-buten-1-ol under catalysis by boron trifluoride diethyl etherate to give butenyl 2,3,4,6-tetra-O-acetyl-β-D-glucopyranoside. The butenyl 2,3,4,6-tetra-O-acetyl-β-D-glucopyranoside was mixed with thioacetic acid in dioxane and AIBN was added as radical initiator; reaction then gave 4-acetylthiobutyl 2,3,4,6-tetra-O-acetyl-β-D-glucopyranoside:

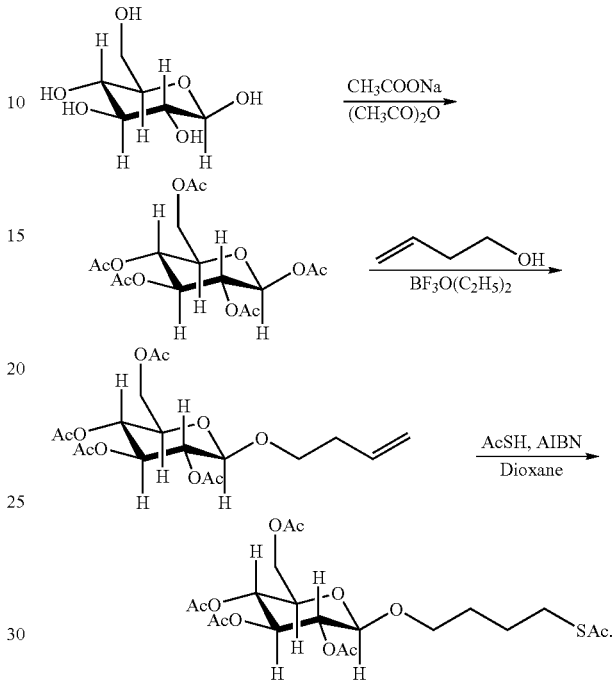

REFERENCE EXAMPLE 3

4-benzylthiobutyl β-D-glucopyranoside was synthesized by the following reactions from β-D-glucopyranose. Thus, acetyl 2,3,4,6-tetra-O-acetyl-β-D-glucopyranoside was prepared by exhaustive acetylation of the hydroxyl groups in β-D-glucopyranose by the action of sodium acetate in acetic anhydride. The acetyl 2,3,4,6-tetra-O-acetyl-β-D-glucopyranoside was subsequently reacted with 3-buten-1-ol under catalysis by boron trifluoride diethyl etherate to give butenyl 2,3,4,6-tetra-O-acetyl-β-D-glucopyranoside. The butenyl 2,3,4,6-tetra-O-acetyl-β-D-glucopyranoside was mixed with benzyl thiol in dioxane and AIBN was added as radical initiator; reaction then gave 4-benzylthiobutyl 2,3,4,6-tetra-O-acetyl-β-D-glucopyranoside. Deacetylation of the 4-benzylthiobutyl 2,3,4,6-tetra-O-acetyl-β-D-glucopyranoside by reaction with sodium methoxide in methanol gave 4-benzylthiobutyl β-D-glucopyranoside:

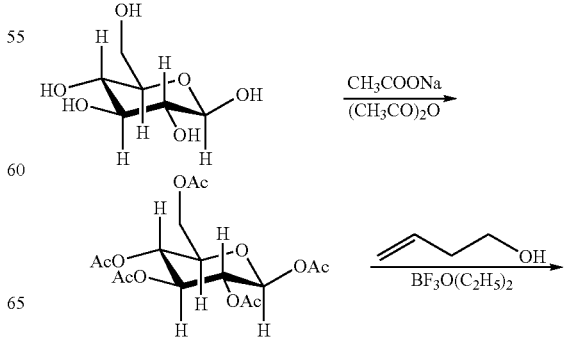

-continued

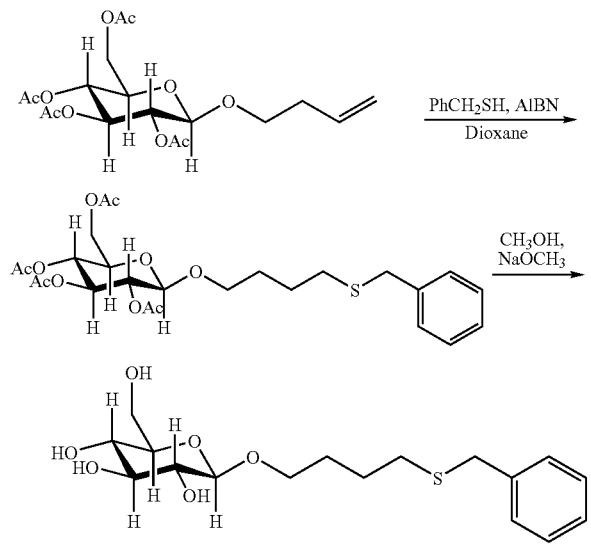

EXAMPLE 1

The tetrakis(bromopropyldimethylsiloxy)silane synthesized in Reference Example 1 (70 mg, 0.086 mmol) and 495 mg (1.034 mmol) of the 4-acetylthiobutyl 2,3,4,6-tetra-O-acetyl-β-D-glucopyranoside synthesized in Reference Example 2 were dissolved in 0.5 mL anhydrous DMF and 0.5 mL anhydrous methanol, and the liquid mixture was stirred for 2 hours at room temperature. Sodium methoxide (62 mg, 1.137 mmol) was then added and stirring was carried out for another 16 hours at 35° C. Acetic acid (0.3 mL) was added, stirring was carried out for 10 minutes at room temperature, and 5 mL acetic anhydride and 5 mL pyridine were then added. The reaction solution was subsequently poured into ice water, and this was extracted 3 times with chloroform. The combined organic layers were washed with 1 N hydrochloric acid, saturated aqueous sodium bicarbonate, saturated aqueous sodium chloride, and then dried over anhydrous magnesium sulfate. After concentration, the product was purified by column chromatography and gel permeation chromatography to give 70 mg of a saccharide residue-functional organopolysiloxane with the following formula:

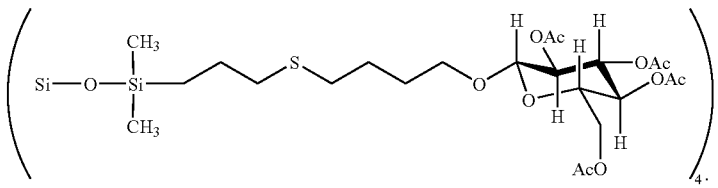

$^1$H-nuclear magnetic resonance spectral data (solvent: deuterochloroform) δ=0.07 (s, 24H), 0.63 (t, J=9 Hz, 8H), 1.5–1.7 (m, 24H), 1.99 (s, 12H), 2.00 (s, 12H), 2.03 (s, 12H), 2.07(s, 12H), 2.4–2.6 (m, 16H), 3.5 (m, 4H), 3.7 (m, 4H), 3.9 (m, 4H), 4.1 (m, 4H), 4.3 (m, 4H), 4.48 (d, J=8 Hz, 4H), 4.97 (t, J=10 Hz, 4H), 5.07 (t, J=10 Hz, 4H), 5.17 (t, J=10 Hz, 4H).

EXAMPLE 2

The product obtained in Example 1 (55 mg, 0.025 mmol) was dissolved in 1 mL dry methanol, 0.53 mg (0.0098 mmol) sodium methoxide was added, and stirring was carried out for 24 hours at room temperature. Cation-exchange resin (0.2 mL, Amberlite® IR-120B H AG) was added to the resulting reaction mixture followed by stirring and then filtration. Concentration of the filtrate in vacuo gave 38 mg of the a saccharide residue-functional organopolysiloxane having the following formula:

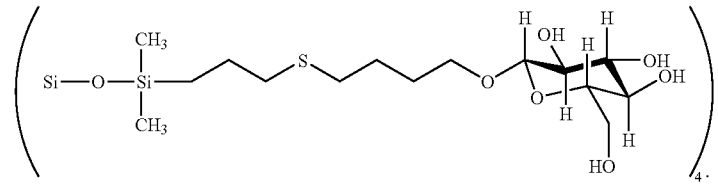

$^1$H-nuclear magnetic resonance spectral data (solvent: deuterium oxide) δ=0.0 (s, 24H), 0.57 (t, J=9 Hz, 8H), 1.5–1.7 (m, 24H), 2.4–2.5 (m, 16H), 3.1 (m, 4H), 3.2–3.4 (m, 12H), 3.5–3.7 (m, 8H), 3.7–3.9 (m, 8H), 4.30 (d, J=8 Hz, 4H).

EXAMPLE 3

The 4-benzylthiobutyl β-D-glucopyranoside synthesized in Reference Example 3 (353 mg, 0.985 mmol) was cooled to −35° C., ammonia gas was bubbled in so as to liquefy 30 mL ammonia, 226 mg (9.85 mmol) sodium metal was added, and stirring was carried out for 30 minutes at −35° C. This was followed by the addition of 474 mg (8.86 mmol) ammonium chloride and 100 mg (0.123 mmol) of the tetrakis(bromopropyldimethylsiloxy)silane synthesized in Reference Example 1 dissolved in 3 mL dimethoxyethane, and while stirring the temperature was then gradually returned to room temperature with evaporation of ammonia gas. After concentration, the product was purified by column chromatography and gel permeation chromatography to give 21 mg of a saccharide residue-functional organopolysiloxane having the same structure as the product in Example 2.

What is claimed is:

1. A saccharide residue-functional organopolysiloxane having the formula:

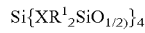

wherein $R^1$ is $C_1$ to $C_{10}$ alkyl or aryl; and X is a group having the formula —$R^2$—S—$R^3$—Y wherein $R^2$ and $R^3$ are each independently selected from $C_1$ to $C_{20}$ divalent hydrocarbyl and Y is selected from a group consisting of a substituted monosaccharide, unsubstituted monosaccharide, substituted oligosaccharide, unsubstituted oligosaccharide, substituted polysaccharide and unsubstituted polysaccharide residue having an oxygen atom bonded to $R^3$.

2. The saccharide residue-functional organopolysiloxane according to claim 1, wherein $R^1$ methyl.

3. The saccharide residue-functional organopolysiloxane according to claim 2, wherein $R^2$ comprises a $C_3$ divalent hydrocarbyl.

4. The saccharide residue-functional organopolysiloxane according to claim 3, wherein $R^3$ comprises a $C_4$ divalent hydrocarbyl.

5. The saccharide residue-functional organopolysiloxane according to claim 4, wherein Y is represented by the formula:

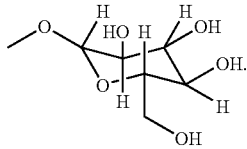

6. The saccharide residue-functional organopolysiloxane according to claim 4, wherein Y is represented by the formula:

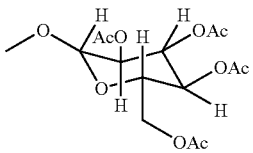

where Ac is acetyl.

7. The saccharide residue-functional organopolysiloxane according to claim 1, wherein Y is a monosaccharide residue.

8. The saccharide residue-functional organopolysiloxane according to claim 1, wherein Y is an oligosaccharide residue containing no more than five saccharide units.

9. The saccharide residue-functional organopolysiloxane according to claim 1, wherein the oxygen atom in Y bonded to $R^3$ is a glycosidic oxygen atom.

10. The saccharide residue-functional organopolysiloxane according to claim 9, wherein $R^1$ is methyl.

11. The saccharide residue-functional organopolysiloxane according to claim 10, wherein $R^2$ comprises a $C_3$ divalent hydrocarbyl.

12. The saccharide residue-functional organopolysiloxane according to claim 11, wherein $R^3$ comprises a $C_4$ divalent hydrocarbyl.

13. The saccharide residue-functional organopolysiloxane according to claim 12, wherein Y is represented by the formula:

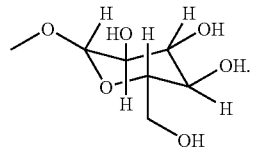

14. The saccharide residue-functional organopolysiloxane according to claim 12, wherein Y is represented by the formula:

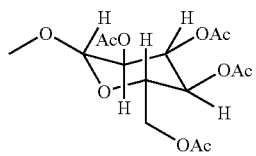

wherein Ac is acetyl.

15. The saccharide residue-functional organopolysiloxane according to claim 1, wherein $R^2$ comprises a $C_3$ divalent hydrocarbyl.

16. The saccharide residue-functional organopolysiloxane according to claim 1, wherein $R^3$ comprises a $C_4$ divalent hydrocarbyl.

17. The saccharide residue-functional organopolysiloxane according to claim 1, wherein Y is represented by the formula:

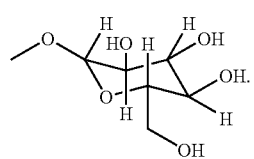

18. The saccharide residue-functional organopolysiloxane according to claim 1, wherein Y is represented by the formula:

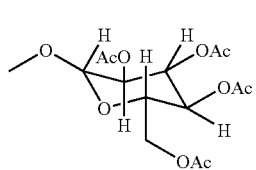

wherein Ac is acetyl.

* * * * *

UNITED STATES PATENT AND TRADEMARK OFFICE
CERTIFICATE OF CORRECTION

PATENT NO.        : 7,208,561 B2
APPLICATION NO. : 10/494626
DATED             : April 24, 2007
INVENTOR(S)       : Makoto Yoshitake It is certified that error appears in the above-identified patent and that said Letters Patent is hereby corrected as shown below:

Column 10, Example 1, please replace formula between lines 25 and 36 with the correct formula shown below

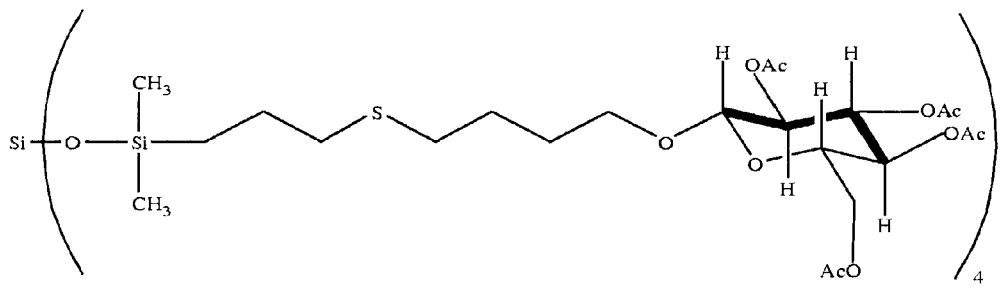

Column 10, Example 2, please replace formula after line 56 with the correct formula shown below

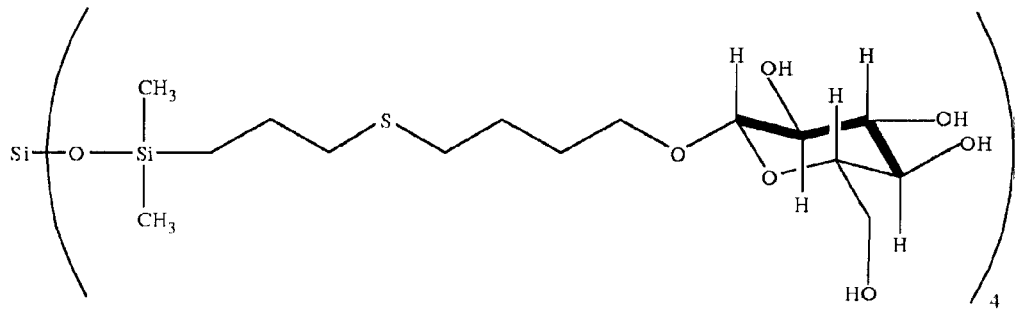

Signed and Sealed this

Twenty-fifth Day of March, 2008

JON W. DUDAS
*Director of the United States Patent and Trademark Office*